United States Patent
Thakkar et al.

(10) Patent No.: US 11,755,383 B2
(45) Date of Patent: Sep. 12, 2023

(54) HYBRID INVENTORY DATA SUMMARIZATION USING VARIOUS INPUT SCHEMA ACROSS HYBRID CLOUD INFRASTRUCTURE

(71) Applicant: VMware, Inc., Palo Alto, CA (US)

(72) Inventors: Sachin Thakkar, San Jose, CA (US); Kiran Kumar Cherivirala, Bangalore (IN); Sureshbabu Koyadan Chathoth, Bangalore (IN); Umar Shaikh, Bangalore (IN); Shruti Parihar, Los Altos, CA (US); Narendra Kumar Basur Shankarappa, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 296 days.

(21) Appl. No.: 17/130,771

(22) Filed: Dec. 22, 2020

(65) Prior Publication Data

US 2021/0200600 A1 Jul. 1, 2021

Related U.S. Application Data

(60) Provisional application No. 62/978,837, filed on Feb. 20, 2020.

(30) Foreign Application Priority Data

Dec. 31, 2019 (IN) .............................. 201941054643

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/505* (2013.01);
(Continued)

(58) Field of Classification Search
CPC .... G06F 9/5077; G06F 9/45558; G06F 9/505; G06F 2009/4557; G06F 2009/45595; G06F 2209/503; G06F 9/5027
See application file for complete search history.

(56) References Cited

U.S. PATENT DOCUMENTS

| 2013/0179894 A1* | 7/2013 | Calder ................ G06F 9/5027 718/104 |
| 2015/0067171 A1* | 3/2015 | Yum ..................... H04L 67/562 709/226 |

(Continued)

OTHER PUBLICATIONS

Ersue, M. "ETSI NFV Management and Orchestration—An Overview," IETF #88, Vancouver, Canada, Nov. 3, 2013, 14 pages.
(Continued)

*Primary Examiner* — Michael W Ayers
(74) *Attorney, Agent, or Firm* — Kim & Stewart LLP

(57) ABSTRACT

A method of collecting and reporting inventory of resources deployed in a data center that includes hardware resources, a virtualization management software executed to provision virtual resources from the hardware resources, and a cloud management server executed to provision the virtual resources for tenants of the data center, includes the steps of: executing a first API call to the virtualization management software to collect first inventory of virtual resources deployed in the data center and a second API call to the cloud computing management software to collect second inventory of virtual resources deployed in the data center; storing the first and second inventory; and in response to an inventory request from a central orchestrator, initially sending a subset of the stored first and second inventory to the central orchestrator in accordance with parameters included in the inventory request, and thereafter sending updates to the subset to the central orchestrator periodically.

20 Claims, 13 Drawing Sheets

(52) U.S. Cl.
CPC .... *G06F 9/5027* (2013.01); *G06F 2009/4557* (2013.01); *G06F 2009/45595* (2013.01); *G06F 2209/503* (2013.01)

(56) References Cited

U.S. PATENT DOCUMENTS

| | | | |
|---|---|---|---|
| 2017/0255890 A1* | 9/2017 | Palavalli | G06Q 10/06 |
| 2017/0329824 A1* | 11/2017 | Hu | G06F 9/5027 |
| 2018/0052945 A1* | 2/2018 | Avazpour | G06F 16/901 |
| 2020/0089518 A1* | 3/2020 | Beyer | G06F 9/5077 |
| 2020/0351347 A1* | 11/2020 | Chang | G06F 11/1453 |
| 2022/0278944 A1* | 9/2022 | Stephan | H04L 41/5051 |

OTHER PUBLICATIONS

Nguyenphu, T. et al. "VNF Descriptor (VNFD) Overview," ETSI 2018, Oct. 8, 2018, 34 pages.
VMware, Inc. "Creating a VMware vCloud NFV Platform," Reference Architecture, Version 1.5, 2015, 40 pages.
VMware, Inc. "Network Functions Virtualization," VMware vCloud NFV Product Documentation, May 31, 2019, 2 pages, URL: https://docs.vmware.com/en/VMware-vCloud-NFV/2.0/vmware-vcloud-nfv-openstack-edition-ra20/GUID-FBEA6C6B-54D8-4A37-87B1-D825F9E0DBC7.html.

* cited by examiner

| DC ID | Type | Location | SR-IOV NIC | High IOPS Storage | Connectivity | CPU cores | Memory | Storage | Network Speed |
|---|---|---|---|---|---|---|---|---|---|
| 1 | Edge | 10001 | Yes | Yes | to 7 | | | | |
| 2 | Edge | 10002 | No | Yes | to 7 | | | | |
| 3 | Edge | 10003 | No | Yes | to 7 | | | | |
| 4 | Edge | 10004 | No | Yes | to 7 | | | | |
| 5 | Edge | 10005 | No | No | to 7 | | | | |
| 6 | Edge | 10006 | No | No | to 7 | | | | |
| 7 | Regional | 10004 | No | Yes | to 1-6, 25 | | | | |
| 8 | Edge | 10008 | Yes | Yes | to 17 | | | | |
| 9 | Edge | 10009 | Yes | Yes | to 17 | | | | |
| 10 | Edge | 10010 | Yes | Yes | to 17 | | | | |
| 11 | Edge | 10011 | Yes | Yes | to 17 | | | | |
| 12 | Edge | 10012 | No | No | to 17 | | | | |
| 13 | Edge | 10013 | No | No | to 17 | | | | |
| 14 | Edge | 10014 | No | No | to 17 | | | | |
| 15 | Edge | 10015 | No | No | to 17 | | | | |
| 16 | Edge | 10016 | No | No | to 17 | | | | |
| 17 | Regional | 10010 | Yes | Yes | to 8-16, 25 | | | | |
| 18 | Edge | 10018 | No | No | to 24 | | | | |
| 19 | Edge | 10019 | No | No | to 24 | | | | |
| 20 | Edge | 10020 | No | No | to 24 | | | | |
| 21 | Edge | 10021 | No | No | to 24 | | | | |
| 22 | Edge | 10022 | No | No | to 24 | | | | |
| 23 | Edge | 10023 | No | No | to 24 | | | | |
| 24 | Regional | 10020 | No | No | to 20-23, 25 | | | | |
| 25 | Core | 10000 | Yes | Yes | to 7, 17, 24 | | | | |

FIGURE 8

| VNF ID | Function | Type | Internal Links | External Links | CPU core | Memory | Storage | Network Speed | Extension |
|---|---|---|---|---|---|---|---|---|---|
| 1 | UPF | Edge | to 2 | | | | | | |
| 2 | SD-WAN | Edge | to 1 | to 8 | | | | | |
| 3 | UPF | Edge | to 4 | | | | | | |
| 4 | SD-WAN | Edge | to 3 | to 10 | | | | | |
| 5 | UPF | Edge | to 6 | | | | | | |
| 6 | SD-WAN | Edge | to 5 | to 10 | | | | | |
| 7 | EPC | Regional | to 8 | | | | | | |
| 8 | SD-WAN | Regional | to 7 | to 2, 13 | | | | | |
| 9 | EPC | Regional | to 10 | | | | | | |
| 10 | SD-WAN | Regional | to 9 | to 4, 6, 13 | | | | | |
| 11 | IMS | Core | to 12 | | | | | | |
| 12 | FW | Core | to 11, 13 | | | | | | |
| 13 | SD-WAN | Core | to 12 | to 8, 10 | | | | | |

FIGURE 9

| VNF ID | Function | Type | DC ID |
|---|---|---|---|
| 1 | UPF | Edge | 1 |
| 2 | SD-WAN | Edge | 1 |
| 3 | UPF | Edge | 8 |
| 4 | SD-WAN | Edge | 8 |
| 5 | UPF | Edge | 9 |
| 6 | SD-WAN | Edge | 9 |
| 7 | EPC | Regional | 7 |
| 8 | SD-WAN | Regional | 7 |
| 9 | EPC | Regional | 17 |
| 10 | SD-WAN | Regional | 17 |
| 11 | IMS | Core | 25 |
| 12 | FW | Core | 25 |
| 13 | SD-WAN | Core | 25 |

FIGURE 11

Recipe for applying licenses to VNFs of a network service provisioned for a customer
Steps:
- Make a REST API call to the URL of a license server, in response to which the license server returns a license key
- Issue instruction to LCP of each data center in which the VNFs have been deployed to execute a workflow script (located at ptr_apply_license) along with the VNF ID, the license key, and bindings
- Receive from the LCPs of the data centers, IDs of VNFs to which the license key has been applied and store the IDs Bindings:
- VNF1; SSH_script
- VNF3; SSH_script
- VNF7; REST API
- VNF9; REST API

FIGURE 12

HYBRID INVENTORY DATA SUMMARIZATION USING VARIOUS INPUT SCHEMA ACROSS HYBRID CLOUD INFRASTRUCTURE

CROSS-REFERENCE TO RELATED APPLICATION(S)

This application claims the benefit of U.S. Provisional Application No. 62/978,837, filed Feb. 20, 2020, and is based upon and claims the benefit of priority from India Provisional Application No. 201941054643, filed Dec. 31, 2019; the entire contents of both of these applications are incorporated herein by reference.

BACKGROUND

An architectural framework, known as network functions virtualization (NFV), has been developed to enable the telecommunication industry to deliver network services with enhanced agility, rapid innovation, better economics and scale. The NFV platform dramatically simplifies delivery of network functions that support the network services by implementing virtual network functions (VNFs) that are delivered through software virtualization on standard hardware. As a result, network service providers have been able to quickly adapt to the on-demand, dynamic needs of telecommunications traffic and services.

A simplified block diagram of the NFV platform is illustrated in FIG. 1. The foundation of the NFV platform is network functions virtualization infrastructure (NFVI) 10 that includes a virtualization manager 20 which is management software that cooperates with hypervisors running in hosts 11 to provision virtual compute, storage and network resources, from physical hardware resources that include hosts 11, storage hardware 12, and network hardware 13.

NFVI 10 may be deployed in a multi-tenant cloud computing environment and FIG. 1 illustrates such a case where a virtualized infrastructure management software, referred to herein as virtualized infrastructure manager (VIM) 30, runs on top of virtualization manager 20 to partition the virtual compute, storage and network resources for different tenants. VIM 30 also exposes the functionality for managing the virtual compute, storage and network resources, e.g., as a set of application programming interfaces (APIs), to allow NFV orchestration software (e.g., NFV orchestrator 50) to deploy VNFs 15 through VNF managers 40 of the corresponding VNFs 15.

Using the NFV platform of FIG. 1, a network service may be provisioned according to the following process. First, NFV orchestrator 50 determines VNFs that need to be deployed to support the network service being provisioned. Then, NFV orchestrator 50 carries out the step of deploying each of the VNFs, which has two phases.

The first phase of VNF deployment is onboarding, which involves getting the VNF package from a vendor of the VNF. The VNF package includes a VNF descriptor which describes the properties of the VNF, a VNF manager, and element management system, and installing them in the NFV platform. The VNF manager is software that is executed to deploy the VNF in NFVI 10 by issuing API calls to VIM 30. As such, a different VNF manager is developed for each of different types of VIM 30 or different software versions of the same type of VIM 30. Virtualized infrastructure management software developed, released, and branded under different names are referred to herein as different "types" of VIM 30. Some examples of different types of VIM 30 are VMware vCloud Director®, OpenStack®, and Kubernetes®. The element management system is software that is executed to manage the configuration of the VNF after the VNF has been instantiated.

The second phase of VNF deployment is instantiation. After the VNF package has been installed in the NFV platform, the VNF manager of that package is executed to instantiate the virtual machines that will function as VNFs according to the requirements specified in the VNF descriptor. More specifically, the VNF manager makes API calls to VIM 30 and VIM 30 communicates with virtualization manager 20 to instantiate and configure the virtual machines that are needed for the VNF. The API call that is made to configure the virtual machines includes a pointer to the element management system. The virtual machines communicate with the element management system to receive initial configuration parameters as well as configuration changes during the lifecycle of the VNF.

To meet the speed and latency goals of 5G networks, VNFs are being deployed as close to the end users as possible. As such, 5G networks employ a far greater number of radio towers, edge compute sites, and regional compute sites than prior generation networks. Scaling a platform that supports deployment of VNFs across hundreds of compute sites to one that supports deployment of VNFs across thousands, even tens of thousands, of sites has proven to be challenging and requires improvements to the NFV platform.

SUMMARY

One or more embodiments provide an improved network functions virtualization platform that is capable of supporting deployment of VNFs across a large number of sites, and enable 5G compliant network services to be provisioned to end users. A network function virtualization platform according to one embodiment employs a distributed orchestration framework using which virtual network functions may be deployed across a hybrid cloud infrastructure that include cloud computing data centers of different types (i.e., cloud computing environments that employ either a different version of the same type of cloud computing management software or different types of cloud computing management software), under the control of a central orchestrator, so as to facilitate deployment of VNFs across thousands, even tens of thousands, of sites.

According to one or more embodiments, management of inventory across the hybrid cloud infrastructure is also distributed. Inventory at each of the cloud computing data centers is collected locally and a summarization of the collected inventory, which is generated according to an input schema specified by the central orchestrator, is reported by each of the data centers to the central orchestrators. With this framework, the central orchestrator is able to make VNF placement decisions based on summarized inventory data pushed thereto by the data centers.

A method of collecting and reporting inventory of resources deployed in a data center to a central orchestrator according to an embodiment, wherein the data center is one of the plurality of data centers and includes hardware resources, a virtualization management server that is running a virtualization management software to provision virtual resources from the hardware resources, and a cloud management server running a cloud computing management software to provision the virtual resources for a plurality of tenants of the first data center, includes the steps of: executing a first API call to the virtualization management software to collect first inventory of virtual resources deployed in the first data center and a second API call to the cloud computing management software to collect second inventory of virtual resources deployed in the first data center; storing the first inventory and the second inventory; and in response to an inventory request from the central orchestrator, initially sending a subset of the stored first inventory and the stored second inventory to the central orchestrator in accordance with parameters included in the inventory request, and thereafter sending updates to the subset to the central orchestrator periodically.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. 8 is a conceptual representation of inventory data that is maintained locally by a central orchestrator the NFV platform according to embodiments.

FIG. 9 is a table that illustrates requirements of each of VNFs of a particular network service.

FIG. 11 is a conceptual representation of data structure for tracking where VNFs have been deployed.

FIG. 12 is a simplified example of a recipe that defines a workflow that is to be executed across VNFs of a network service.

DETAILED DESCRIPTION

Figure 1:
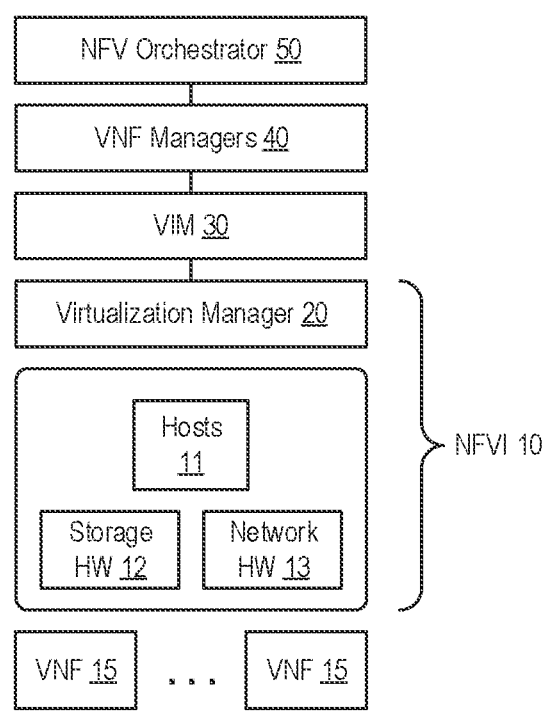
FIG. 1 is a simplified block diagram of a network functions virtualization (NFV) platform of the prior art.
Figure 2:
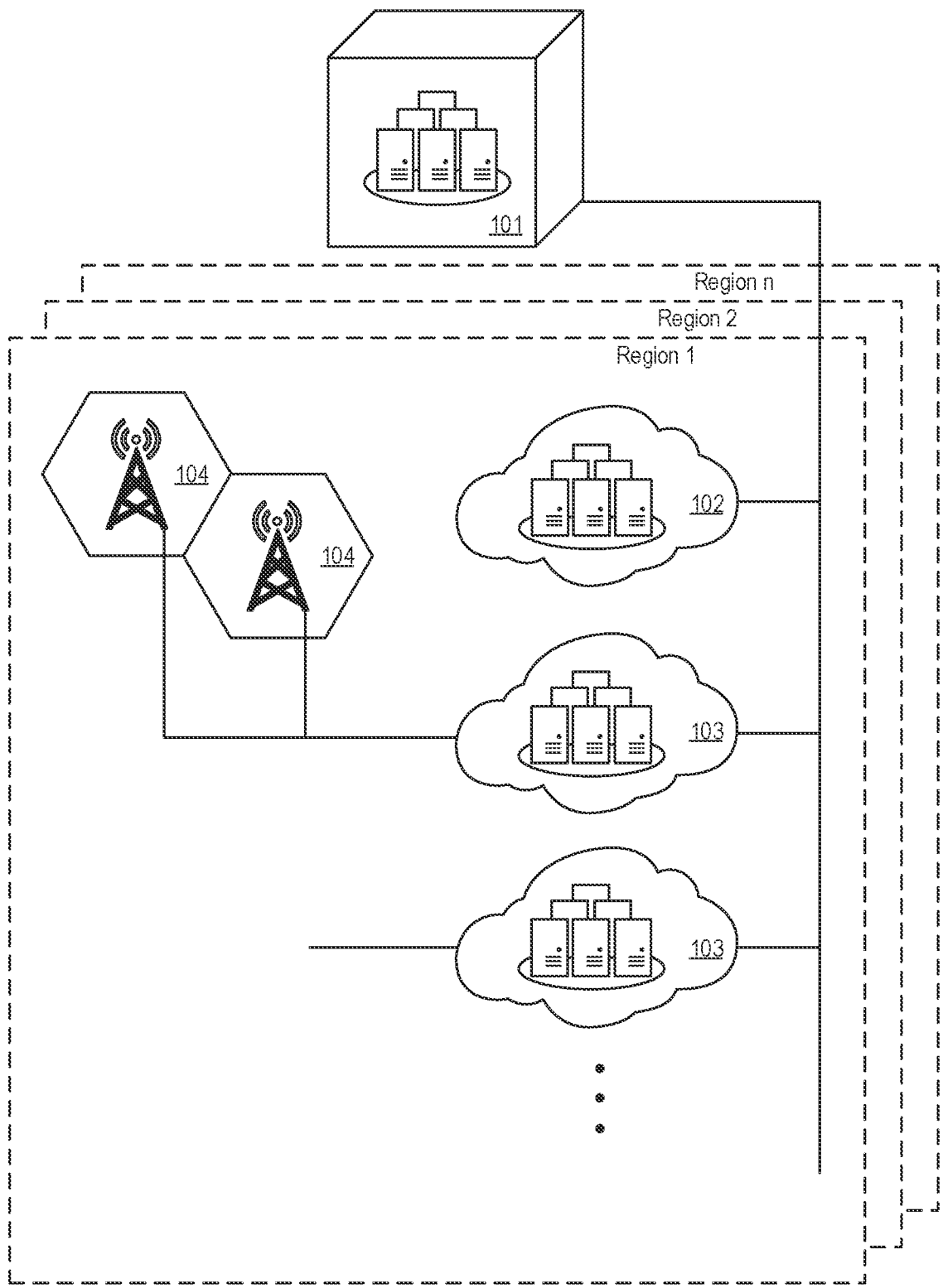
FIG. 2 is a schematic diagram of a 5G network in which embodiments may be implemented.

FIG. 2 is a schematic diagram of a 5G network in which embodiments may be implemented. The 5G network includes a plurality of interconnected data centers, which include one or more core data centers 101, a plurality of regional data centers 102 (one for each of regions 1, 2, . . . , n), and a plurality of edge data centers 103 (only two of which are shown) in each region. In addition to the interconnected data centers, the 5G network includes a plurality of radio towers 104 (only two of which are shown) on which hardware under control of edge data centers 103 is mounted. In a 5G network, the total number of these sites, including core data centers 101, regional data centers 102, and edge data centers 103 is in the thousands, tens of thousands, or much more. In addition, the number of edge data centers 103 is an order of magnitude larger than the number of regional data centers 102.

VNFs are deployed across the data centers of the 5G network and even onto hardware mounted on radio towers 104. Examples of VNFs that are deployed include User Plane Function (UPF), Enhanced Packet Core (EPC), IP Multimedia Subsystem (IMS), firewall, domain name system (DNS), network address translation (NAT), network edge, and many others. To achieve the speed and latency goals of 5G networks, some of these VNFs, such as UPF, need be located as close to the end users as possible.

Figure 3:
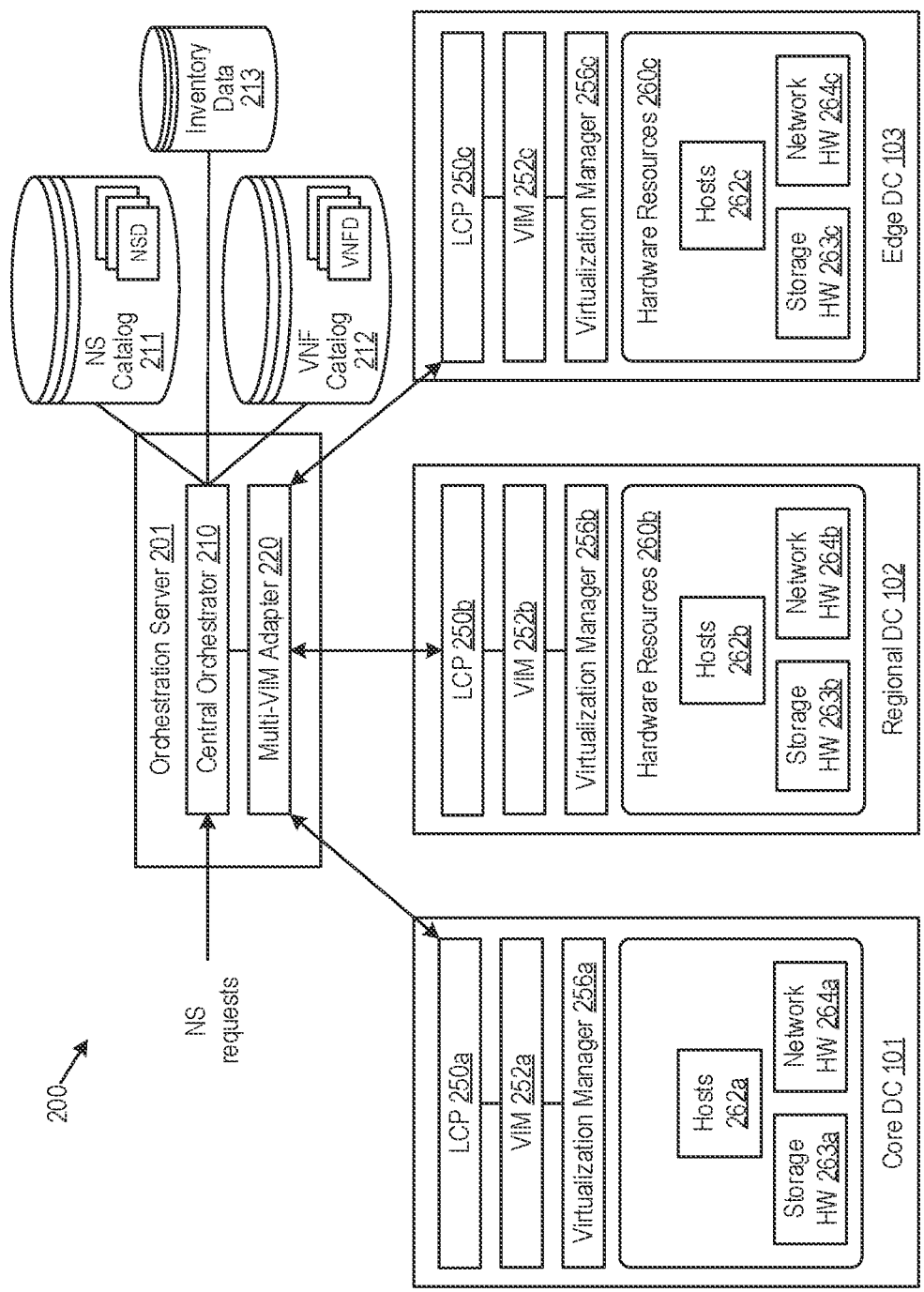
FIG. 3 is a block diagram of an NFV platform according to embodiments.

FIG. 3 is a block diagram of a network functions virtualization (NFV) platform according to embodiments. The NFV platform according to the embodiments is depicted as NFV platform 200 and includes an orchestration server 201 that is connected to core data center (DC) 101, regional data center (DC) 102, and edge data center (DC) 103 over a communications network. In the actual implementation, NFV platform 200 is connected to all of the core data centers, regional data centers, and edge data centers over the communications network but to simplify the drawing and the description, only one core DC 101, one regional DC 102, and one edge DC 103 are depicted in FIG. 3.

Orchestration server 201 provides a main management interface for a network service provider and, as depicted, has two software modules running therein, a central orchestrator 210 and multi-VIM adapter 220.

Central orchestrator 210 receives network service requests and relies on several data stores configured in non-volatile storage devices, to carry out its orchestration tasks. The first is network service (NS) catalog 211 which stores network service descriptors for all of the different network services that can be provisioned or has been provisioned by NFV platform 200. The second is VNF catalog 212 in which VNF descriptors of VNFs from various vendors are stored. A third data store illustrated in FIG. 3 is the one for inventory data 213, the use of which will be described in further detail below in conjunction with FIG. 8-10.

Each VNF that needs to be deployed to support a network service goes through an onboarding phase. The onboarding phase involves getting a VNF package from a vendor of the VNF. The VNF package includes a VNF descriptor (VNFD), a VNF manager, and element management system (EMS), and installing them in NFV platform 200. VNFD is a file that describes the properties of the VNF, including resources needed (e.g., amount and type of virtual compute, storage, and network resources), software metadata (e.g., software version of the VNF), connectivity descriptors for external connection points, internal virtual links and internal connection points, lifecycle management behavior (e.g., scaling and instantiation), supported lifecycle management operations and their operations, supported VNF specific parameters, and affinity/anti-affinity rules. As described above, VNFDs are stored in VNF catalog 212. The VNF manager is proprietary software that the VNF vendor has developed for deploying the VNF onto conventional NVFI and is optionally provided in the embodiments so that it can be used to deploy the VNF onto conventional NVFI. The EMS is also proprietary software that the VNF vendor has developed to manage the configuration of a VNF after a virtual machine for the VNF has been instantiated. The virtual machine communicates with the EMS to receive initial configuration parameters as well as configuration changes during the lifecycle of the VNF.

For each network service request that central orchestrator 210 receives, central orchestrator 210 searches NS catalog 211 for a network service descriptor corresponding to the request. In general, a network service descriptor contains identification information of all the VNFs that are used by the network service, network connectivity requirements for the VNFs, CPU utilization and other factors related to performance of each virtual machine on which a VNF is to be deployed, and specifications on when to heal the VNFs and when to scale the network service. Upon completing a successful search, central orchestrator 210 retrieves the network service descriptor from NS catalog 211 and extracts information it needs to carry out the request.

The information extracted from the network service descriptor includes identification information of all of the VNFs that are used by the network service. For all such VNFs, central orchestrator 210 retrieves into memory the corresponding VNF descriptor from VNF catalog 212, and parses the VNF descriptors to extract information it needs to carry out the request. In particular, central orchestrator 210 generates commands for multi-VIM adapter 220 based on the extracted information and issues the commands to multi-VIM adapter. Multi-VIM adapter 220 then generates a set of generic commands to be issued to various, selected cloud computing data centers of the 5G network.

The commands generated by multi-VIM adapter 220 are generic in that they do not have to comply with any particular format required by cloud computing management software running the different cloud computing data centers. As such, the same set of commands may be sent to cloud computing data centers running different types of cloud computing management software and to cloud computing data centers running different versions of the same type of cloud computing management software. Because of this flexibility and the ubiquitousness of cloud computing data centers, network services that meet the performance requirements of 5G networks can be potentially rolled out according to embodiments without constructing new cloud computing data centers.

The 5G network depicted in FIG. 2 include one or more core data centers and core DC 101 depicted in FIG. 3 is representative of the core data centers. Hardware resources 260a of core DC 101 include hosts 262a, storage hardware 263a, and network hardware 264a. Virtualization manager 256a is a virtualization management software executed in a physical or virtual server, that cooperates with hypervisors installed in hosts 262a to provision virtual compute, storage and network resources, including virtual machines, from hardware resources 260a.

VIM 252a is a virtualized infrastructure management software executed in a physical or virtual server, that partitions the virtual compute, storage and network resources provisioned by virtualization manager 256a for different tenants. VIM 252a also exposes the functionality for managing the virtual compute, storage and network resources, e.g., as a set of APIs, to local control plane (LCP) 250a. LCP 250a is a physical or virtual appliance that receives the set of generic commands from multi-VIM adapter 220 and translates these commands into API calls that recognizable by VIM 252a.

Regional DC 102 depicted in FIG. 2 is representative of the regional data centers. Hardware resources 260b of regional DC 102 include hosts 262b, storage hardware 263b, and network hardware 264b. Virtualization manager 256b is a virtualization management software executed in a physical or virtual server, that cooperates with hypervisors installed in hosts 262b to provision virtual compute, storage and network resources, including virtual machines, from hardware resources 260b.

VIM 252b is a virtualized infrastructure management software executed in a physical or virtual server, that partitions the virtual compute, storage and network resources provisioned by virtualization manager 256b for different tenants. VIM 252b also exposes the functionality for managing the virtual compute, storage and network resources, e.g., as a set of APIs, to LCP 250b. LCP 250b is a physical or virtual appliance that receives the set of generic commands from multi-VIM adapter 220 and translates these commands into API calls that recognizable by VIM 252b.

Edge DC 103 depicted in FIG. 2 is representative of the edge data centers. Hardware resources 260c of edge DC 103 include hosts 262c, storage hardware 263c, and network hardware 264c. Hosts 262c include hosts installed in a particular edge data center and also hosts that are mounted on radio towers 104 that are served by that particular edge data center. Similarly, storage hardware 263c and network hardware 264c include storage hardware and network hardware installed in a particular edge data center and also storage hardware and network hardware that are mounted on radio towers 104 that are served by that particular edge data center. Virtualization manager 256c is a virtualization management software executed in a physical or virtual server, that cooperates with hypervisors installed in hosts 262c to provision virtual compute, storage and network resources, including virtual machines, from hardware resources 260c.

VIM 252c is a virtualized infrastructure management software executed in a physical or virtual server, that partitions the virtual compute, storage and network resources provisioned by virtualization manager 256c for different tenants. VIM 252c also exposes the functionality for managing the virtual compute, storage and network resources, e.g., as a set of APIs, to LCP 250c. LCP 250c is a physical or virtual appliance that receives the set of generic commands from multi-VIM adapter 220 and translates these commands into API calls that recognizable by VIM 252c.

According to embodiments, LCPs 250a of the core data centers, LCPs 250b of the regional data centers, and LCPs 250c of the edge data centers in combination with multi-VIM adapter 220 implement the functionality of multi-site virtual infrastructure orchestration of network services. As a result of decentralizing the virtual infrastructure orchestration of network services, VNFs can be deployed across thousands or even tens of thousands of these data centers and even onto hardware mounted on radio towers, so that they can be located as close to the end users as possible.

Figures 4, 5:
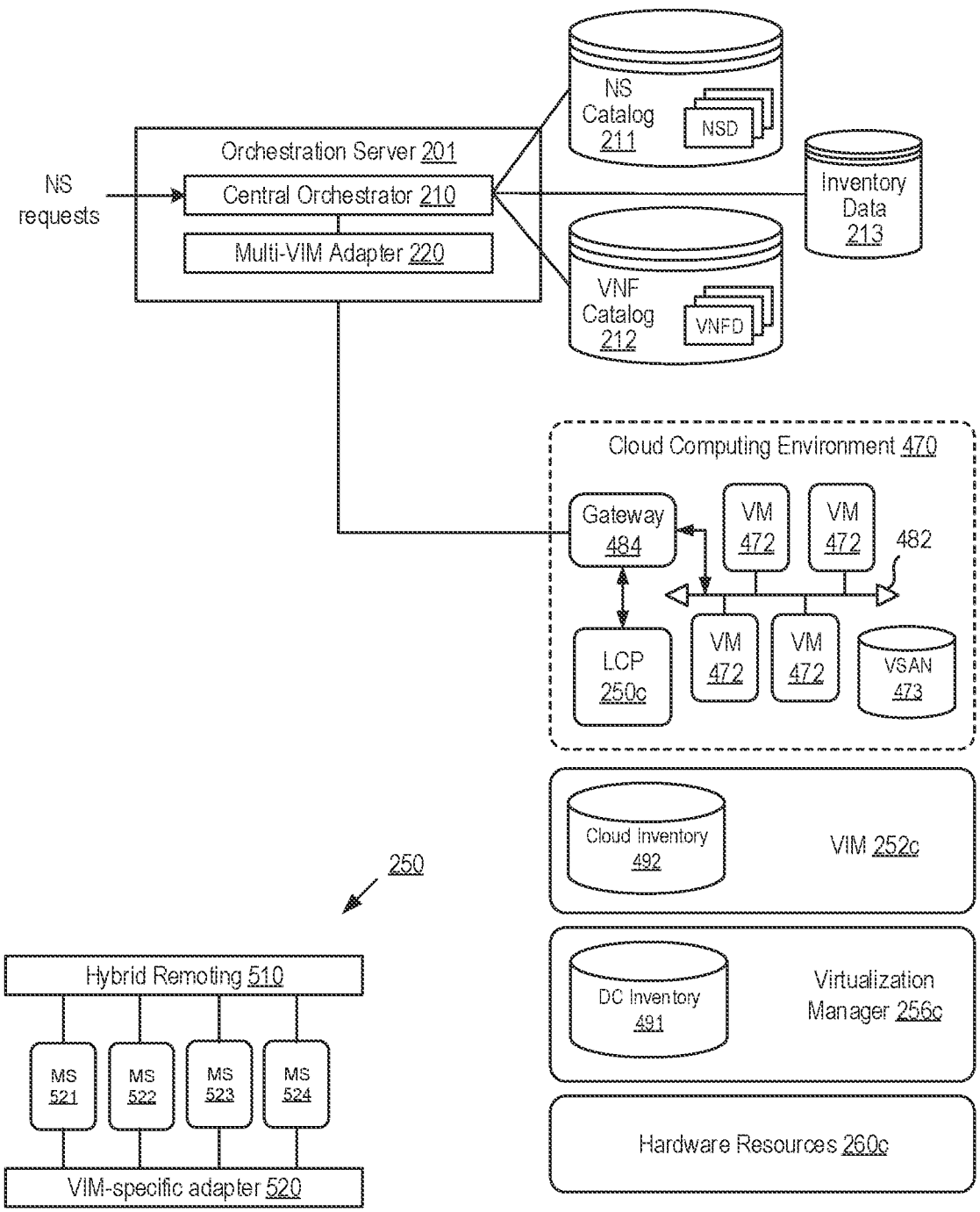
FIG. 4 is a simplified block diagram of the NFV platform of FIG. 3 that shows in greater detail the virtual resources provisioned in a cloud computing environment.
FIG. 5 illustrates different software modules of a local control plane of the NFV platform according to embodiments.

FIG. 4 is a simplified block diagram of the NFV platform of FIG. 3 that shows in greater detail the virtual resources provisioned in a cloud computing environment. The cloud computing environment depicted in FIG. 4 is provisioned in an edge data center and is representative of cloud computing environments provisioned in a core data center as well as a regional data center.

As shown in FIG. 4, hardware resources 260c of the edge data center include hosts 262c, storage hardware 263c, and network hardware 264c. Virtualization manager 256c cooperates with hypervisors installed in hosts 262c to provision virtual compute, storage and network resources, including virtual machines 472, from hardware resources 260c. Inventory of virtual compute, storage and network resources is maintained as a data center (DC) inventory 491 in a storage device of virtualization manager 256c.

VIM 252c partitions the virtual compute, storage and network resources provisioned by virtualization manager 256c for different tenants. Inventory of virtual compute, storage and network resources for each of the tenants is maintained as cloud inventory 492 in a storage device of VIM 252c.

Cloud computing environment 470 is representative of a cloud computing environment for a particular tenant. In cloud computing environment 470, VMs 472 have been provisioned as virtual compute resources, virtual SAN 473 as a virtual storage resource, and virtual network 482 as a virtual network resource. Virtual network 482 is used to communicate between VMs 472 and is managed by at least one networking gateway component (e.g., gateway 484). Gateway 484 (e.g., executing as a virtual appliance) is configured to provide VMs 472 with connectivity to an external network (e.g., Internet). Gateway 484 manages external public IP addresses for cloud computing environment 470 and one or more private internal networks interconnecting VMs 472. Gateway 484 is configured to route traffic incoming to and outgoing from cloud computing environment 470 and provide networking services using VNFs for firewalls, network address translation (NAT), dynamic host configuration protocol (DHCP), and load balancing. Gateway 484 may be configured to provide virtual private network (VPN) connectivity over the external network with another VPN endpoint, such as orchestration server 201. Gateway 484 may be configured to provide Ethernet virtual private network (EVPN) connectivity over the external network so that it can communicate with multiple number of other data centers.

Local control planes of different cloud computing environments (e.g., LCP 250c of cloud computing environment 470) are configured to communicate with multi-VIM adapter 220 to enable multi-site virtual infrastructure orchestration of network services. LCP 250c (e.g., executing as a virtual appliance) may communicate with multi-VIM adapter 220 using Internet-based traffic via a VPN tunnel established between them, or alternatively, via a direct, dedicated link.

FIG. 5 illustrates different software modules of a local control plane 250 (representative of one of LCP 250a, 250b, 250c). LCP 250 includes a hybrid remoting service 510 for handling communications with multi-VIM adapter 220. Hybrid remoting service 510 is responsible for breaking down the generic commands issued by multi-VIM adapter 220 into instructions to be executed by worker nodes that are depicted in FIG. 5 as microservices (MS) 521, 522, 523, 524. These microservices may be run in one virtual machine within individual containers, and translate a generic command with one or more parameters into one or more APIs in the format that is recognized by the underlying VIM to which VIM-specific adapter 520 is connected. In one embodiment, MS 521 handles the translation of a generic command with one or more parameters into compute APIs recognized by the underlying VIM, and MS 522 handles the translation of a generic command with one or more parameters into storage APIs recognized by the underlying VIM. MS 523 handles the translation of a generic command with one or more parameters into network extension APIs recognized by the underlying VIM. MS 524 handles the translation of a generic command with one or more parameters into firewall configuration APIs recognized by the underlying VIM. Accordingly, the microservices perform a translation of a generic command into a domain specific command (e.g., API) that the underlying VIM understands. Therefore, microservices that perform the translation for a first type of VIM, e.g., OpenStack, will be different from microservices that perform the translation for a second type of VIM, e.g., kubernetes.

Figure 6:
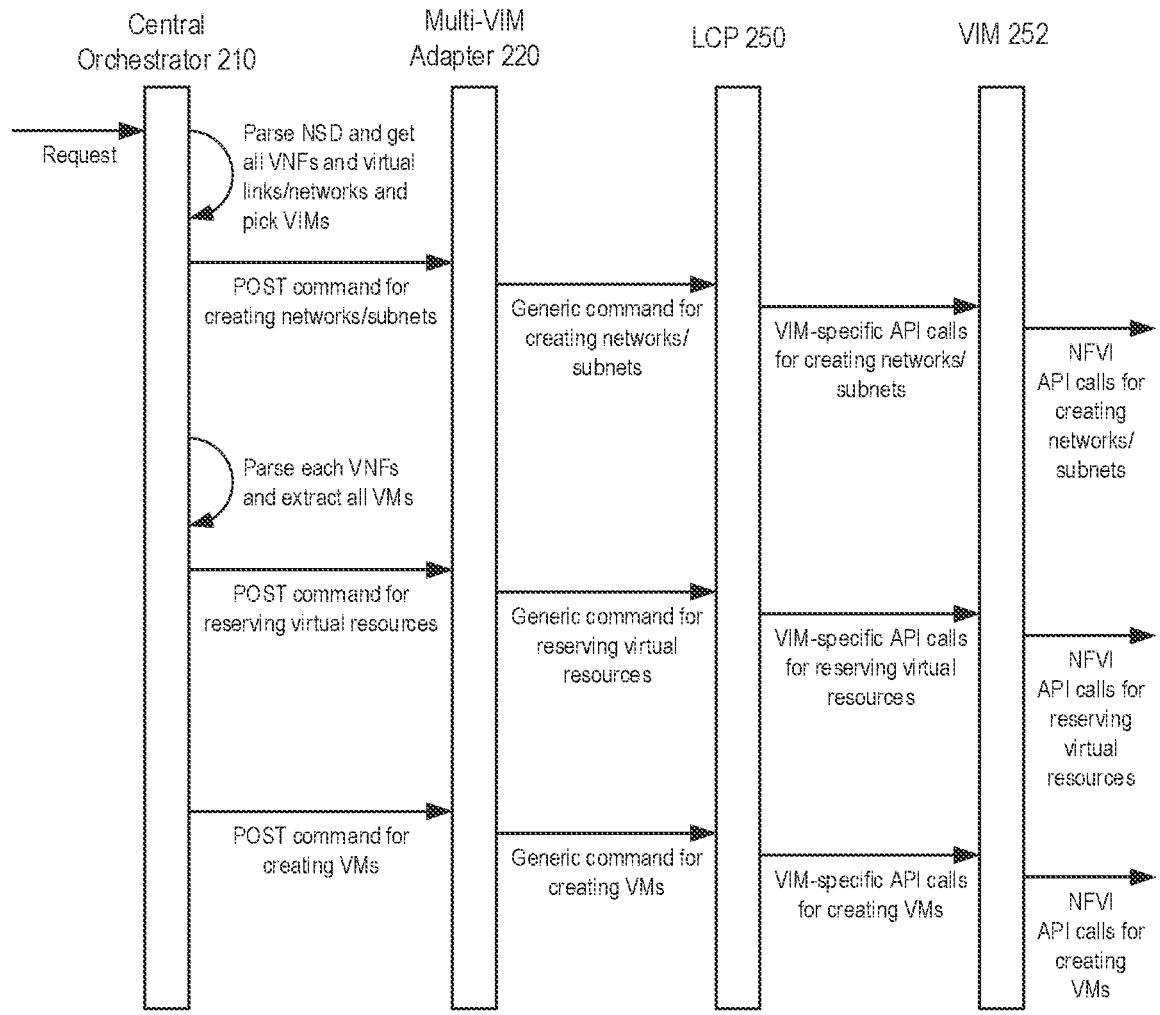
FIG. 6 is a conceptual diagram illustrating one example of a flow of commands that are generated according to embodiments when a request for or relating to a network service is received by a network service provider.

FIG. 6 is a conceptual diagram illustrating one example of a flow of commands that are generated according to embodiments when a request for or relating to a network service is received by a network service provider. In the embodiments described herein, the request is received by central orchestrator 210. The request may come in any form and in one embodiment originates from OSS/BSS (operations support system and business support system) in a standard format. The request may be a request for a new network service, an expansion of a network service into a particular geographical area, upgrading of a network service, a termination of a network service, and so forth. In the example illustrated in FIG. 6, it is assumed that the request is for a new network service.

Upon receiving the request, central orchestrator 210 retrieves a corresponding network service descriptor from NS catalog 211. Central orchestrator 210 receives network service requests and for each request received, searches NS catalog 211 for a network service descriptor corresponding to the request and VNF catalog 212 for VNF descriptors of VNFs that are used by the requested network service. Upon completing a successful search, central orchestrator 210 retrieves the network service descriptor from NS catalog 211 and extracts information it needs to carry out the request.

For a request for a new network service, the information extracted from the network service descriptor includes identification information of all of the VNFs that are used by the network service, network connectivity requirements for the VNFs, CPU utilization and other factors related to performance of each virtual machine on which a VNF is to be deployed. Based on the extracted information, central orchestrator 210 issues a command to multi-VIM adapter 220 to create networks and subnets required by the new network service. In addition, for all the VNFs that are used by the network service, central orchestrator 210 parses the VNF descriptors to extract information relating to the VMs that need to be deployed to run the VNFs. Then, central orchestrator 210 issues commands to multi-VIM adapter 220 to create flavors for the VMs (i.e., to reserve resources for the VMs) and to create the VMs. Table 1 below provides examples of POST commands that are generated by central orchestrator 210 and issued to multi-VIM adapter 220. Multi-VIM adapter 220 translates these commands into a set of generic commands that it issues to LCPs of various, selected cloud computing data centers. These generic commands and parameters for these generic commands are shown in italics below each corresponding POST command.

TABLE 1

Input to Multi-VIM adapter when the request is for a new network service

```
POST /api/{tenantId}/networks    //command to create networks for {tenantID}
{
  "name": string,      ////name of network
  "shared": boolean,   //if the network "name" is already created, this would have a value of 1
  "networkType": string,   //L2 or L3
  "segmentationId": int,   //if the network is part of a VLAN, specify the VLAN ID
}
Generic command:
Create networks(name, shared, newtorkType, segmentationID)
POST /api/{tenantId}/subnets    //command to create subnets for {tenantId}
{
  "networkId": string,   //ID of the network previously created
  "name": string,   //name of subnet
  "cidr": string,   //classless inter-domain routing
  "ipVersion": int,   //IPv4 or IPv6
  "enableDhcp": boolean,   //is DHCP enabled?
  "gatewayIp": string,   //IP address of this subnet's gateway
  "dnsNameservers": Array of string,   //IP addresses of DNS nameservers
  "allocationPools": Array of Allocation Pool Object   //subnet range can be specified:
[startIP1, endIP1; startIP2, endIP2; ...]
}
Generic command:
Create subnets(networkID, name, cidr, ipVersion, enableDhcp, gatewayIp, dnsNameservers,
allocationPools)
POST /api/{tenantId}/flavors    //command to create flavors for {tenantId}
{
  "vcpu": int,   //number of vCPUs
  "name": string,   //flavor name
  "memory": int,   //size of memory to be allocated
  "disk": int,   //size of disk to be allocated
}
Generic command:
Create flavors(vcpu, name, memory, disk)
POST /api/{tenantId}/servers    //command to create VMs for {tenantId}
{
  "name": string,    // name of VM
  "boot": Boot Object,    // boot object of VM
  "nics": Array of Nic Object,    //array of NIC objects
  "volumes": Array of Volume Object,    //array of storage volume objects
  "availabilityZone": string,    //VM resource pool (e.g., management VMs, data VMs, etc.)
  "flavorId": Array of string,    //ID of flavor previously created
  "metadata": Array of key-value pairs,    //key-value pairs needed for first time init scripts
  "serverGroup": string,    //affinity and anti-affinity
  "userData": string    //custom script not included in VM image
}
Generic command:
Create servers(name, boot, nics, volumes, availability Zone, flavorID, metadata, serverGroup,
userData)
```

LCP 250, upon receiving the set of generic commands, translates each of the generic commands into a set of VIM-specific API calls. In particular, microservices running inside LCP 250 translate the generic commands into calls made to APIs that are exposed by the underlying VIM.

Upon receiving the API calls that it recognizes, VIM 252 then makes calls to APIs exposed by the underlying NFVI, e.g., APIs exposed by virtualization manager 256. For example, in response to NFVI-specific API calls for instantiating VNFs, virtual machines in which VNFs are implemented and virtual disks for the virtual machines are instantiated. Then, virtualization manger 256 updates DC inventory 491 with IDs of the instantiated virtual machines and virtual disks and also returns the IDs of deployed virtual machines and virtual disks to VIM 252. VIM 252 in turn adds the IDs of the instantiated virtual machines and virtual disks into cloud inventory 492 and associates such IDs with the tenant for whom VIM 252 instantiated the virtual machines and virtual disks and the IDs of VNFs for which they have been deployed.

Figure 7:
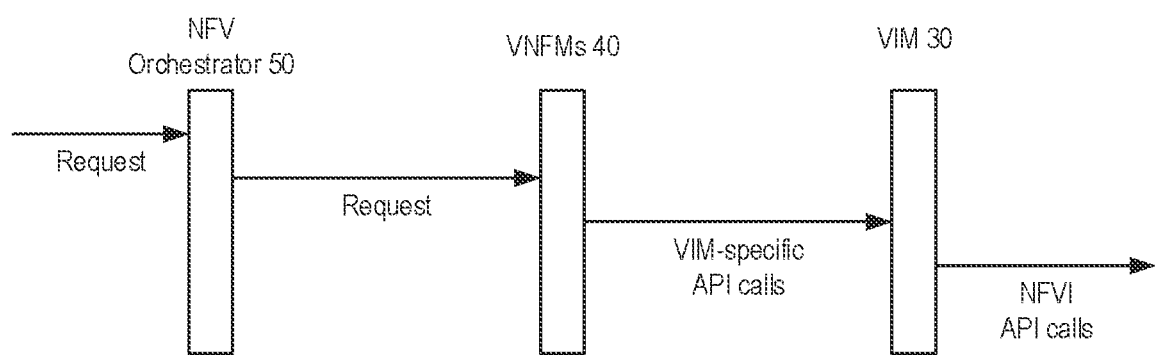
FIG. 7 is a conceptual diagram illustrating a flow of commands that are generated according to the prior art when a request for or relating to a network service is received by a network service provider.

FIG. 7 is a conceptual diagram illustrating a flow of commands that are generated according to the prior art when a request for or relating to a network service is received by a network service provider. According to the prior art, NFV orchestrator 50 identifies VNF managers 40 corresponding to the VNFs that used by the requested network service and sends the request for or relating to the network service to each such VNF managers 40. Each of VNF managers 40 then issue VIM-specific API calls to VIM 30 to carry out the request.

As discussed above, a major advantage provided by the embodiments over the prior art is scalability. Another advantage is in the handling of software upgrades, e.g., to virtual infrastructure management software. For example, in the prior art, if VIM 30 was upgraded, all of VNF managers 40, which are issuing VIM-specific API calls to VIM 30, will have to be modified to be compliant with the upgraded APIs of VIM 30. On the contrary, embodiments can support a rolling-type of upgrade, where all VIMs 252 of a particular type do not need to be upgraded at the same time. Therefore, if VIM 252*a* was OpenStack version 1.14, and VIM 252 of one hundred other data centers was OpenStack version 1.14, an upgrade to OpenStack version 1.15 can be carried out one VIM at a time according to embodiments, because an upgrade to a VIM of a particular data center will require the corresponding LCP 250 of that data center to be modified. Upgrades to VIMs of all the other data centers can be carried out at a later time, one VIM at a time.

FIG. 8 is a conceptual representation of inventory data 213 that is maintained locally by central orchestrator 210 for all of the data centers that it is connected to. Inventory data 213 includes static inventory data, dynamic utilization data, and inter data center connectivity information, all of which are reported by local control planes 250 of the core, regional, and edge data centers. The static inventory data and the virtual network connections are reported once by each data center, e.g., upon installation or instantiation, and after any updates are made to the static inventory data and the virtual network connections at the data center. Updates to the dynamic utilization data and are pushed to central orchestrator 210 by local control planes 250 of the data centers on a periodic basis. The process of collecting and reporting all such data by local control planes 250 is further described below in conjunction with FIGS. 15-16.

The static inventory data, in the example of FIG. 8, includes a yes/no indication as to whether an SR-IOV NIC is available at the data center, a yes/no indication as to whether a high IOPS storage device is available at the data center, and physical resource information such as the total number of CPU cores, the total memory capacity, the total storage capacity, and maximum ingress/egress network speed. The dynamic utilization data, in the example of FIG. 8, indicates a percentage of available CPU cores, a percentage of available memory, a percentage of available storage, and average ingress/egress network speed. The inter data center connectivity information, in the example of FIG. 8, indicates which data centers have a dedicated high-speed network connection established between them. Additional attributes of the data centers are shown in the table of FIG. 8. These additional attributes include a number that is used to uniquely identify each data center. the type of data centers, as in core, regional, or edge, and the location of the data centers, recorded as a zip code in this example.

FIG. 9 is a table that illustrates requirements of each of VNFs of a particular network service. Central orchestrator 210 tracks these requirements, matches them against the type and inventory data of data centers, and selects the data centers in which the VNFs will be deployed. Each row of the table in FIG. 9 represents a VNF that is specified in the network service descriptor. Properties of the VNF that are specified in the network service descriptor include the network function, the type of network function as in core, regional, or edge, and required internal and external links (e.g., virtual network connections). The required internal links may be achieved through connections to a virtual switch, and the required external links may be achieved through gateways, such as virtual private network (VPN) gateways or software-defined wide area network (SD-WAN) gateways. In addition, the links may be point-to-point as in the case of VPNs or may be multi-point as in the case of an ethernet VPN (EVPN).

The virtual resource requirements, CPU core, memory, storage, and network speed, are extracted from the descriptors of the VNFs. The column "Extension" represents an extension attribute of the corresponding VNF descriptor, which may specify, for example, that an SR-IOV NIC is required or a high TOPS storage is required. The extension attribute may be defined by the vendor of the VNF, by the network service customer, or generally by any entity that wants to specify custom placement constraints for the VNF.

In FIGS. 8 and 9, data center inventory data and VNF requirements are represented in tables for illustrative purposes. The actual data structure that is employed to maintain and track such data may be of any format that is accessible and searchable by central orchestrator 210. In addition, such data is stored in local memory employed by central orchestrator 210 during execution of the method of FIG. 10 described below.

Figure 10:
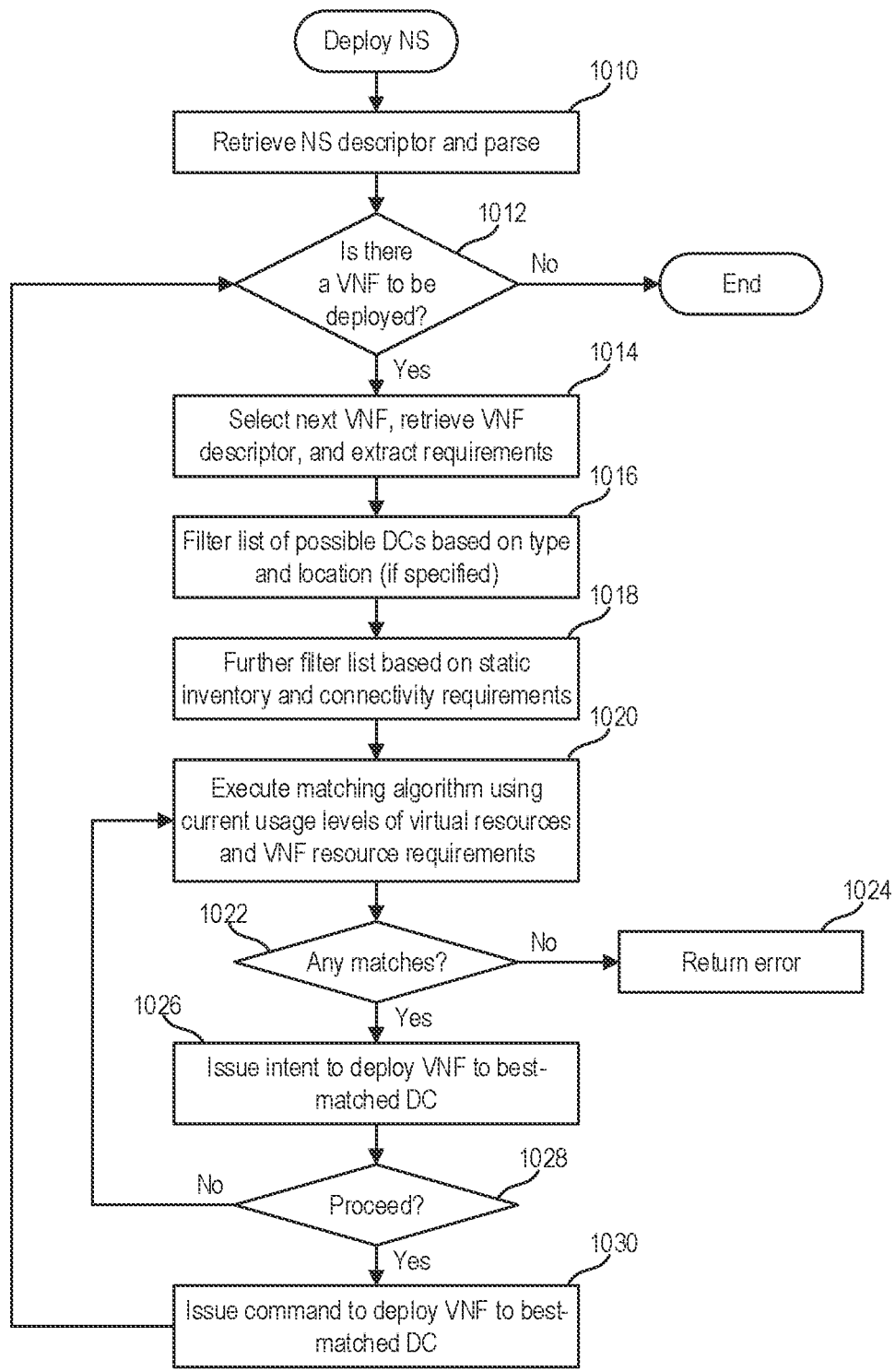
FIG. 10 is a flow diagram of a method executed by the central orchestrator for selecting data centers to which VNFs of a network service are to be deployed.

FIG. 10 is a flow diagram of a method executed by central orchestrator 210 for selecting data centers to which VNFs of a network service are to be deployed. The method begins at step 1010 where central orchestrator 210 retrieves a descriptor of the network service from NS catalog 211 and parses the descriptor to identify the requirements specified in the network service descriptor and the VNFs that need to be deployed to support the network service. Then, central orchestrator 210 executes the loop beginning at step 1012 to deploy the VNFs until there are no more VNFs to be deployed.

At step 1014, central orchestrator 210 selects the next VNF to be processed through the loop, retrieves a descriptor of that VNF from VNF catalog 212, and extracts the requirements specified in the VNF descriptor. The requirements may specify the VNF type. If the VNF type is "edge," the VNF is to be deployed in an edge data center. If the VNF type is "regional," the VNF is to be deployed in a regional data center. If the VNF type is "core," the VNF is to be deployed in a core data center. The requirements may also specify network connectivity requirements and minimum resource requirements.

At step 1016, central orchestrator 210 filters the data centers, which in a 5G network may number in the thousands or tens of thousands, based on two criteria. First, the filtering is done based on any location requirement for the network service to be deployed. The location requirement may have been specified, for example, in the network service request. So, if the location for the network service is a certain city, all data centers within zip codes that are not in that city will be filtered out. Second, the filtering is done based on the VNF type. If the VNF type is "edge," regional and core data centers are filtered out. If the VNF type is "regional," edge and core data centers are filtered out. If the VNF type is "core," edge and regional data centers are filtered out.

At step 1018, central orchestrator 210 performs a further filtering based on static inventory and network connectivity requirements. A static inventory requirement may be for an SR-IOV NIC, a high IOPS storage, or a minimum memory or storage capacity. A network connectivity requirement may require a virtual network connection to another VNF specified in the network service descriptor. All data centers that cannot meet the static inventory requirement(s) and the network connectivity requirement(s) are filtered out.

At step 1020, central orchestrator 210 executes a matching algorithm based on current usage levels of the virtual resources in the data centers that remained after the filtering steps of 1016 and 1018 and the resource requirements specified in the VNF descriptor. Any well-known algorithm for possible candidates (in this example, data centers) against requirements (in this example, VNF requirements) may be employed. If there are no matches (step 1022, No), central orchestrator 210 at step 1024 returns an error in response to the network service request. If there are matches (step 1022, Yes), central orchestrator 210 at step 1026 selects the best matched data center and issues an intent to deploy the VNF to the best-matched data center.

When the intent to deploy to the VNF is issued to the best-matched data center, the best-matched data center responds synchronously to that request by sending updates to its inventory data maintained by central orchestrator 210. Central orchestrator 210 updates the inventory data for the best-matched data center and confirms if the best-matched data center is still able to meet the resource requirements of the VNF. If so (step 1028, Yes), central orchestrator 210 at step 1030 issues the command to deploy the VNF to the best-matched data center. If not (step 1028, No), central orchestrator executes step 1020 again to find another match.

After step 1030, the process returns to step 1012, at which central orchestrator 210 selects the next VNF to be deployed and the process described above after 1012 is repeated for that VNF.

It should be recognized that by having central orchestrator 210 maintain a state of the inventory of all the data centers locally, VNF placement decisions in connection with a network service deployment can be made immediately by comparing the requirements of the network service and the VNFs required by the network service and the state of the inventory maintained by central orchestrator 210. Polling of the data centers for their inventory state at the time the network service is requested may be practicable in prior generation networks when there are only a few dozen data centers. However, with 5G networks in which VNF placement decisions need to be made across thousands, tens of thousands, or more data centers, polling the data centers will result in considerable delays in the deployment of VNFs and ultimately the deployment of the requested network service. Accordingly, embodiments provide an efficient technique for deploying VNFs to support network services deployed in 5G and other future generation networks.

In addition, as the VNFs are deployed across the data centers, central orchestrator 210 tracks where the VNFs have been deployed. Central orchestrator 210 employs a data structure to track such correspondence, hereinafter referred to as a tracking data structure, and stores such tracking data structure in a fourth data store. FIG. 11 provides a conceptual representation of such tracking data structure in the form of a table 1100. Each row of table 1100 represents a VNF that has been deployed, and the information that is tracked for each VNF includes its network function, its type as in core, regional, or edge, and an identifier of the data center in which it has been deployed. Table 1100 provides a simplified view of where the VNFs have been deployed, so it should be understood that, in actual implementations, the number of VNFs is much greater than as shown in table 1100.

In addition, table 1100 is a tracking data structure for just one network service that has been deployed. In actual implementations, central orchestrator 210 maintains a separate tracking data structure for each network service that has been deployed. Accordingly, for any network service that has been deployed, central orchestrator 210 has a holistic view of where (e.g., which data centers) the VNFs for that network service have been deployed and is able to specify workflows to be executed across all such VNFs.

In one embodiment, a workflow that is to be executed across VNFs of a network service is defined in a recipe, which is stored in NS catalog 211, together with or separately from the descriptor of the network service. A simplified example of one such recipe is illustrated in FIG. 12. The recipe illustrated in FIG. 12 is a recipe for executing a workflow to apply licenses to all VNFs of a network service that has been provisioned for a particular customer. The recipe is divided into "steps" and "bindings." "Steps" define a series of actions to be carried out. "Bindings" define the VNFs on which the actions are to be carried out and how.

In particular, the "steps" defined in the recipe illustrated in FIG. 12 specify the following actions: (1) make a REST API call to a URL of a license server, in response to which the license server returns a license key; (2) issue an instruction to execute a workflow script (which is located at a pointer: ptr_apply_license) for applying the license key to LCP 250 of each data center in which the VNFs have been deployed, along with the VNF ID, the license key, and bindings; and (3) receive from each LCP 250, IDs of VNFs to which the license key has been applied and store the IDs. The "bindings" defined in the recipe illustrated in FIG. 12 list the VNFs on which the "steps" are to be carried out. For each VNF listed, the bindings also specify the method by which the workflow is to be executed. Two examples are SSH script or REST API. With the "SSH script" method, the workflow script is retrieved using the pointer to the workflow script, injected into the VM implementing the VNF, and run inside that VM. With the "REST API" method, a REST API call that specifies the pointer to the workflow script is made to the VM implementing the VNF and the VM executes the workflow script in response to the REST API call.

Figure 13:
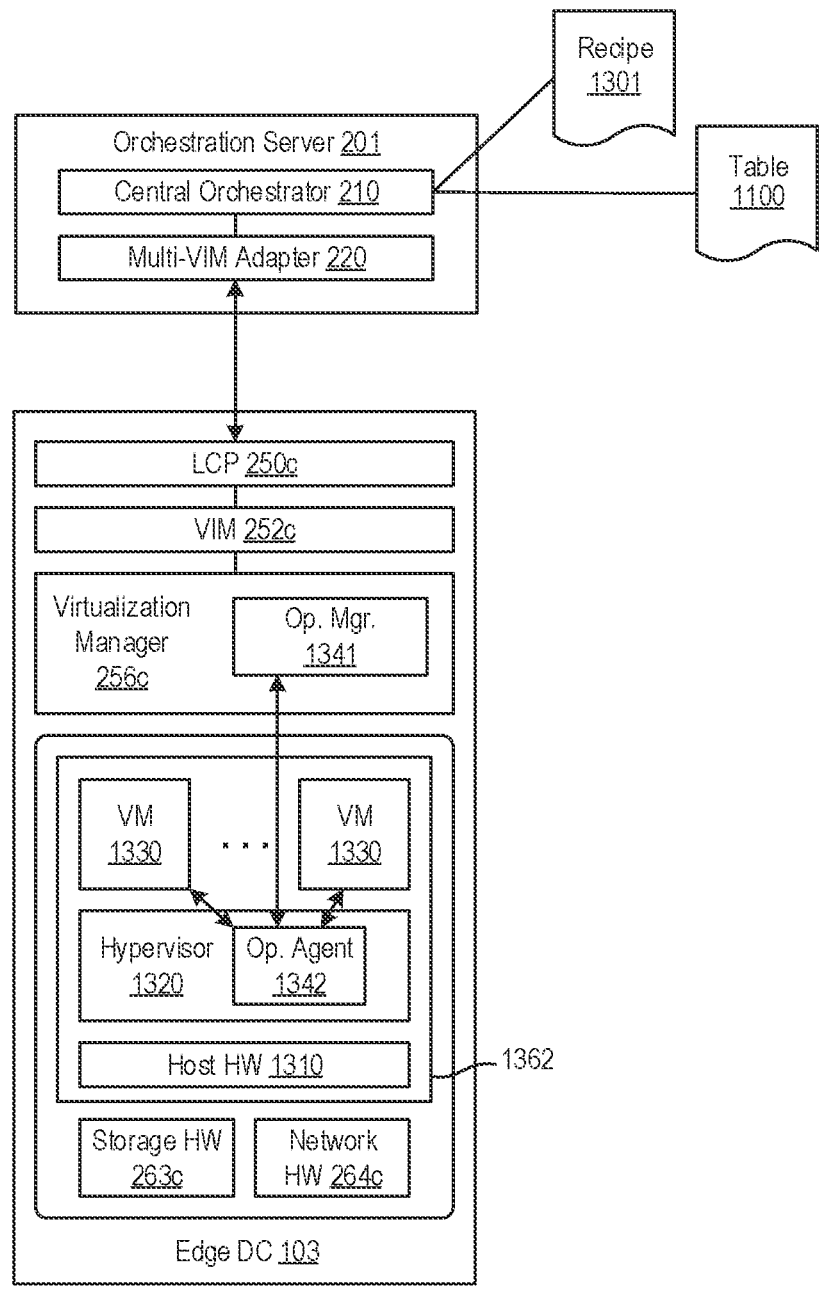
FIG. 13 illustrates software components of the NFV platform according to embodiments that execute a workflow across VNFs of a network service.
Figure 14:
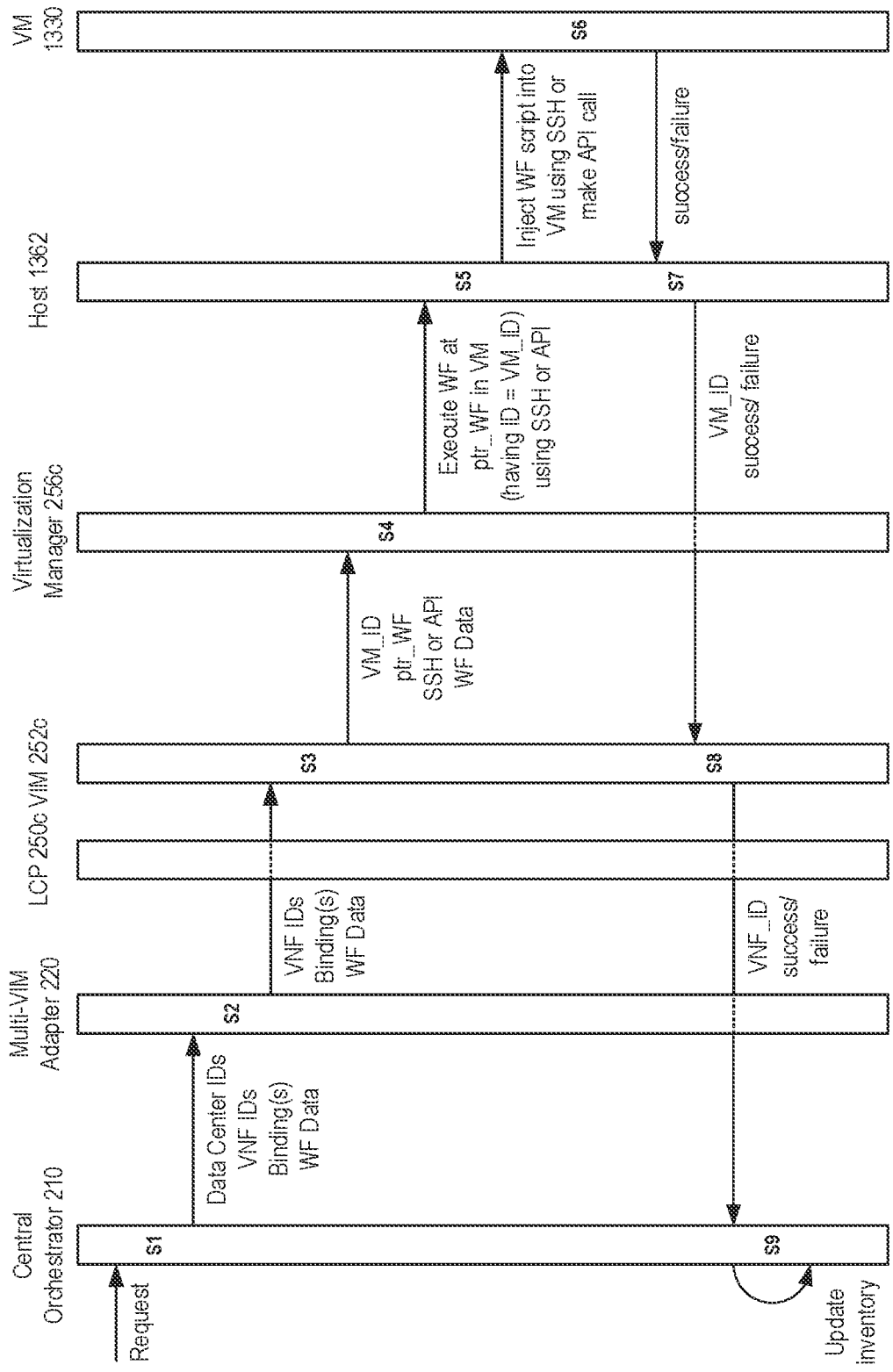
FIG. 14 illustrates a flow of steps executed by the software components shown in FIG. 13 to execute a workflow across VNFs of a network service, according to embodiments.

FIGS. 13 and 14 illustrate software components of an NFV platform and a flow of steps executed by the software components to execute a workflow across VNFs of a network service, according to embodiments. To simplify the illustration and the description, only one data center, in particular an edge data center 103, and only one host 1362, are shown in FIG. 13. However, they are representative of all other data centers of the NFV platform and all other hosts of the NFV platform.

As illustrated in FIG. 13, host 1362 includes a hardware platform, host hardware 1310, and a virtualization software, hypervisor 1320, running on top of host hardware platform 1310 to support the running of virtual machines, VMs 1330. Hypervisor 1320 includes an agent, shown as operations agent 1342, that cooperates with a management software (operations manager 1341) running in virtualization manager 256c to perform various management operations on VMs 1330. When the "SSH script" method is employed to execute the workflow, operations agent 1324 retrieves the workflow script using the pointer to the workflow script, injects the workflow script into VMs 1330 through a special backdoor channel by which hypervisor 1320 is able to control VMs 1330, and causes the workflow script to be run inside VMs 1330. With the "REST API" method, operations agent 1324 makes a REST API call that specifies the pointer to the workflow script to VMs 1330 and VMs 1330 execute the workflow script in response to the REST API call.

The flow illustrated in FIG. 14 includes steps S1-S9. Steps S1, S2, and S9 are carried out by central orchestrator 210 and multi-VIM adapter 220. The other steps, S3-S8 are carried out by software components in each of the data centers to which multi-VIM adapter issues a workflow execution command. However, to simply the description, steps S3-S8 are described only with respect to software components of edge data center 103 shown in FIG. 13.

The flow begins at step S1 where, in response to a request to execute a workflow in the VNFs, central orchestrator 210 retrieves recipe 1301 corresponding to the workflow and begins carrying out the actions specified in the "steps" of recipe 1310. For the license example given above, central orchestrator 210 obtains a license key from a license server. At step S1, central orchestrator 210 also extracts relevant "bindings" from recipe 1301 (e.g., for each VNF listed in the "bindings" section, the ID of the VNF and a selection of the method by which the workflow script is to be executed in the VM implementing the VNF) and passes them down to multi-VIM adapter 220 along with workflow data, e.g., the license key.

At step S2, multi-VIM adapter 220 issues a separate workflow execution command for each of the VNFs. Each such command is issued to the data center having the data center ID corresponding to the VNF and includes a pointer to the workflow script to be executed, the ID of the VNF, the selection of the method by which the workflow script is to be executed in the VM implementing the VNF, and the workflow data.

Upon receipt of the workflow execution command from multi-IM adapter 220, LCP 250c passes it down to VIM 252c, which then executes step S3. In executing step S3, VIM 252c identifies the VM that implemented the VNF having the VNF ID, and passes down to virtualization manager 256c, the VM ID, the pointer to the workflow script, the selection of the method by which the workflow script is to be executed in the VM implementing the VNF, and the workflow data.

At step S4, operations manager 1341 of virtualization manager 256c communicates with operations agent 1324 running in hypervisor 1320 of host 1362 to execute the workflow in the VM having the VM ID using the selected SSH or REST API method. At step S5, when the "SSH script" method is selected, operations agent 1324 retrieves the workflow script using the pointer to the workflow script, injects the workflow script into the VM through the special backdoor channel by which hypervisor 1320 is able to control the VM, and instructs the VM to execute the workflow script. On the other hand, when the "REST API" method is selected, operations agent 1324 makes a REST API call that specifies the pointer to the workflow script to the VM.

At step S6, the VM executes the workflow script and returns an indication of success or failure to operations agent 1324. In turn, operations agent 1324 at step S7 returns the indication of success or failure along with the VM ID to operations manager 1341, which forwards the message to VIM 252c. At step S8, VIM 252c looks up the VNF ID corresponding to the VM ID and sends the indication of success or failure along with the VNF ID to LCP 250c, which forwards the message to multi-VIM adapter 220, when then forwards the message to central orchestrator 210. At step S9, central orchestrator 210 updates its inventory to indicate success or failure of the execution of the workflow for the VNF corresponding the VNF ID.

Other examples of workflows that may be executed in the virtual machines implementing the VNFs includes capacity operations, e.g., scale-out operations that are prompted by virtual machines that are consuming more than a threshold percentage of the CPU, healing operations performed on virtual machines implementing VNFs, that failed to respond to a health check, bootstrapping an SD-WAN VNF with information to connect to a management plane of the SD-WAN, applying patches to VNFs, backing up and restoring configuration settings of VNFs, running a test script in VNFs, and configuring VNFs for disaster recovery.

In addition, workflows that are executed in the virtual machines implementing the VNFs according to the same recipe may be carried out in parallel if there are no dependencies. In some situations, workflows may be run in two parts where the second part relies on results from the first part. In such situations, the responses from the virtual machines that have executed the first part are returned to central orchestrator 210 and then central orchestrator 210 issues additional commands through multi-VIM adapter 220 for one or more other virtual machines to execute the second part.

For example, when updating a license that has been granted for running a particular company's IMS VNF, central orchestrator 210 needs to know the MAC addresses of all UPF VNFs in radio towers that are connected to the IMS VNF. Accordingly, central orchestrator 210 executes the first part of the workflow to gather the MAC addresses of virtual machines that have implemented the UPF VNFs. Once all of the MAC addresses have been collected, central orchestrator 210 then pushes that information to the data center in which the virtual machine that implements the IMS VNF is running along with a workflow execution command to update the information about the granted license, in particular how many and which UPF VNFs are licensed.

Figure 15:
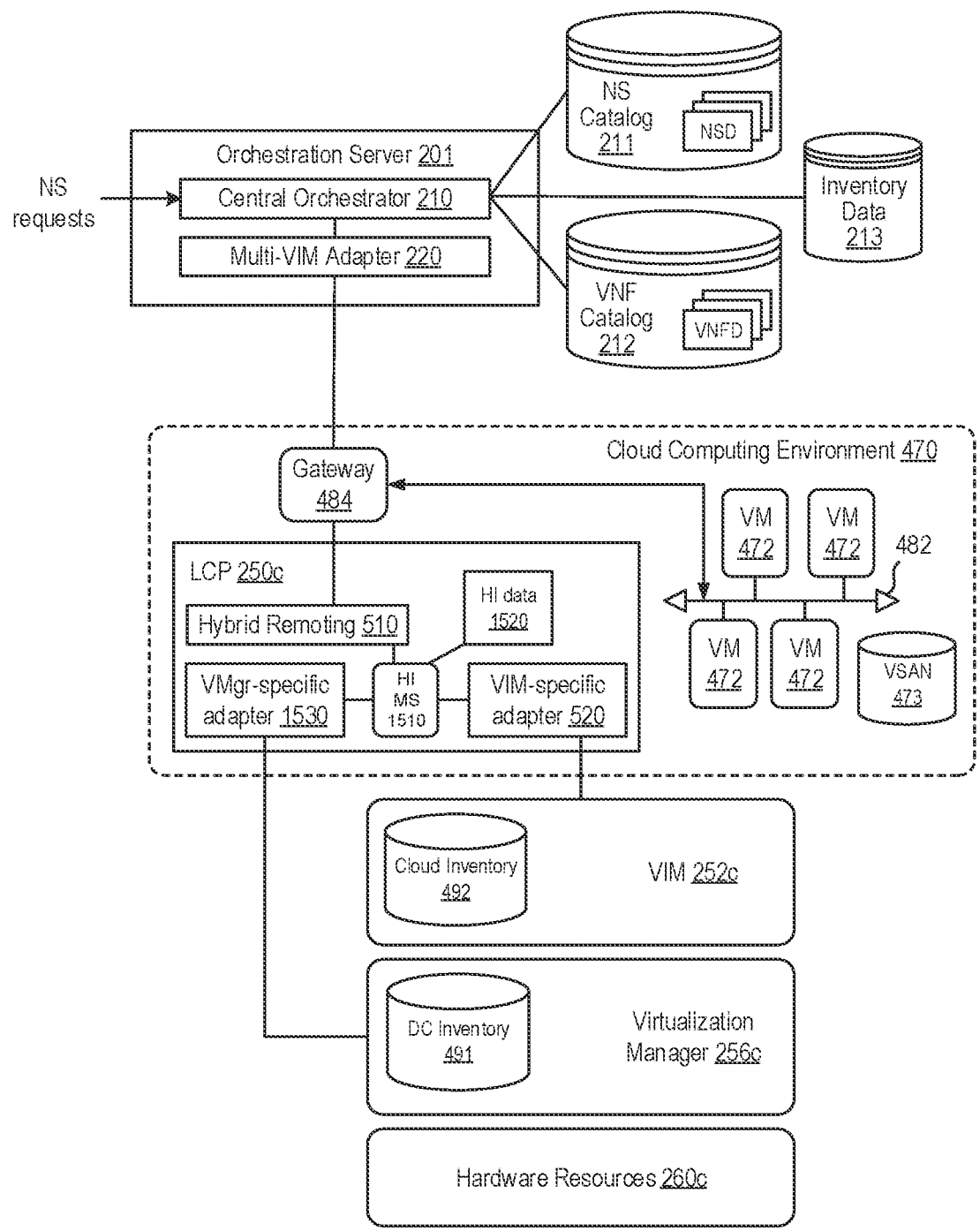
FIG. 15 is a block diagram that illustrates software modules of a data center that collect inventory of virtual and physical resources that are available in the data center.

FIG. 15 is a block diagram that illustrates software modules of a data center that collect inventory of virtual and physical resources that are available in the data center. For simplicity, FIG. 15 depicts software modules of LCP 250c of edge data center 103 as an example, and it should be understood that LCPs 250 of other types of data centers, e.g., core data center 101 and regional data center 102, include the same software modules for collecting inventory of virtual and physical resources that are available in these other data centers.

The software modules of the data center that collect inventory of the data center include a hybrid inventory microservice (HI MS) 1510 that receives requests for inventory from orchestration server 201 through hybrid remoting service 510. HI MS 1510 is a microservice that may be implemented as a container running in the same virtual machine as MS 521, 522, 523, 524. HI MS 1510 collects inventory data by issuing API calls for collecting inventory data through VIM-specific adapter 520 and API calls for collecting inventory data through virtualization manager specific adapter 1530. HI MS 1510 can issue API calls that are recognizable by VIM 252c and virtualization manager 256c because it is aware of the type of the cloud computing management software running in VIM 252c and the type of the virtualization management software running in virtualization manager 256c.

The API calls issued to VIM 252c instruct VIM 252c to collect the inventory data and send notifications of changes in the inventory data according to an input schema when the input schema designates one or more properties of inventory collections that the cloud computing management software running in VIM 252c are to collect and track for changes. Table 2 below is an example input schema for such inventory data. In this example, the inventory collection relates to VMs, and the properties of the VMs to collect and track are: name of the VM, number of CPUs allocated for the VM, amount of memory allocated for the VM in MB, guest operating system installed in the VM, object ID of the VM, and the organization (tenant) that owns the VM. In addition, the variable, vcd, in front of these properties specify the type of cloud computing management software running in VIM 252c. After the API calls are issued, HI MS 1510 stores the inventory data returned by the cloud computing management software (represented as HI data 1520 in FIG. 15) in memory (and optionally, a storage device). Thereafter, upon receipt of notifications of changes in the inventory data through VIM-specific adapter 520, HI MS 1510 updates HI data 1520 stored in memory to reflect the changes.

TABLE 2

```
{
    "name":"VM",
    "requiredProperties": [
        {"name":"vcd.name","mandatory":true},
        {"name":"vcd.numberOfCpus","mandatory":true},
        {"name":"vcd.memoryMB","mandatory":true},
        {"name":"vcd.guestOs","mandatory":true},
        {"name":"vcd.objectId","mandatory":true},
        {"name":"organization","mandatory":true}
    ]
}
```

The requests for inventory received from orchestration server 201 also specify an input schema which designates one or more properties of inventory collections that HI MS 1510 are to track for changes. Table 3 below is an example input schema for such tracked inventory. Using the input schema depicted in Table 3, orchestration server 201 is requesting HI MS 1510 to report back a complete list of unique keys of VMs that have been deleted. Therefore, even though HI MS 1510 receives notifications of all changes in the tracked properties through VIM-specific adapter 520, HI MS 1510 processes only those notifications relevant for reporting back the complete list of unique keys of VMs that have been deleted to orchestration server 201.

TABLE 3

```
{
    "name":"VM",
    "allowedProperties": [
        {"name":"vcd"}
        {"name":"organization"}
    ],
    "uniqueKeys":[
    "vcd.objectId"
    ]
    "deletedData":{
    "algo":"CompleteList"
    }
    "syncIntervalInSec":"syncInterval"
}
```

For certain inventory data, the cloud computing management software may not send out any notifications. In such situations, HI MS 1510 makes an API call to the cloud computing management software to acquire such data at periodic intervals. For example, the cloud computing management software may not send any notifications with respect to real-time usage of resources such as CPU and memory.

In a similar manner, the API calls issued to virtualization manager 256c instruct virtualization manager 256c to send notifications of changes in the inventory data according to the input schema when the input schema designates one or more properties of inventory collections that the virtualization management software running in virtualization manager 256c are to collect and track for changes. Some examples of the inventory data to collect and track are VMs, virtual networks, virtual SAN, and specialized hardware, such as SR-IOV NICs and high IOPS storage. After the API calls are issued, HI MS 1510 stores the inventory data returned by the virtualization management software (represented as HI data 1520 in FIG. 15) in memory (and optionally, a storage device). Thereafter, upon receipt of notifications of changes in the inventory data through virtualization manager specific adapter 1530, HI MS 1510 updates HI data 1520 stored in memory to reflect the changes.

For certain inventory data, the virtualization management software may not send out any notifications. In such situations, HI MS 1510 makes an API call to the virtualization management software to acquire such data to acquire such data at periodic intervals. For example, the cloud computing management software may not send any notifications with respect to real-time usage of resources such as CPU and memory.

Figure 16:
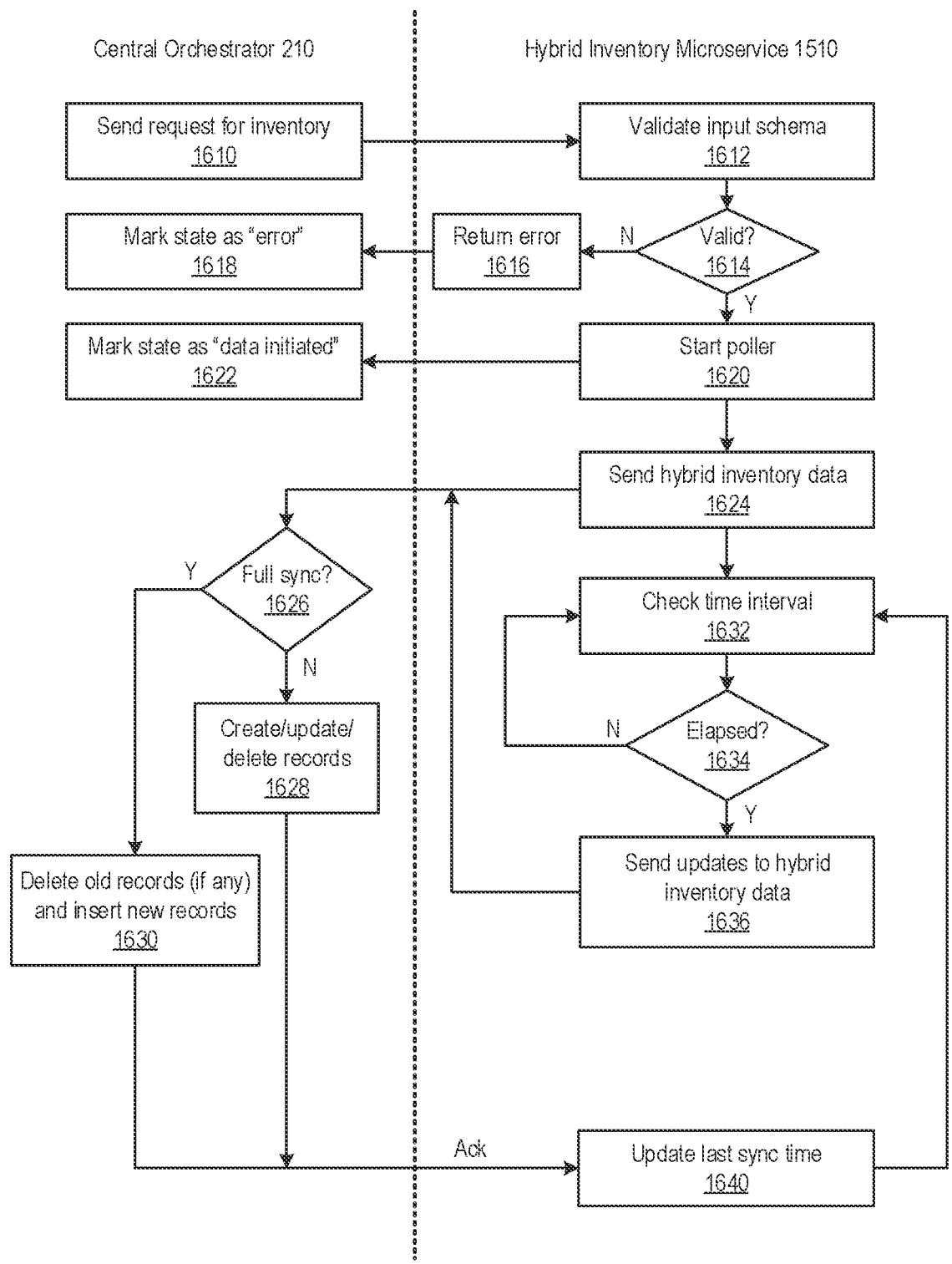
FIG. 16 is a flow diagram that illustrates a method carried out at each data center to push updates in its local inventory to a central orchestrator.

FIG. 16 is a flow diagram that illustrates a method carried out at each data center to push updates in its local inventory to a central orchestrator, e.g., central orchestrator 210. The method of FIG. 16 begins at step with a request for inventory issued by the central orchestrator to the data center. As described above, the request is processed by HI MS 1510 and includes an input schema. HI MS 1510 at steps 1612 and 1614 determines if the input schema is valid. The input schema may not be valid if neither the cloud computing management software nor the virtualization management software has been issued API calls to collect and track such inventory data. If the input schema is not valid, HI MS 1510 returns an error message at step 1616 and the central orchestrator marks the state of the request as "error" at step 1618. If the input schema is valid, HI MS 1510 launches a poller thread (referred to herein as the "poller" for short) for processing the request at step 1620 and the central orchestrator marks the state of the request as "data initiated" at step 1622. The subsequent steps on the side of HI MS 1510 are carried out by the poller.

Initially, the poller at step 1624 sends the complete inventory data specified in the input schema (e.g., HI data 1520) to the central orchestrator. Upon receipt of the complete inventory data from the poller, the central orchestrator at step 1626 determines that a full sync is being performed. Therefore, the central orchestrator at step 1630 inserts new inventory records in memory. If there are any old inventory records for the corresponding data center, the central orchestrator deletes them before creating the new ones. Upon completion of step 1630, an ack message is sent back to the poller, which at step 1640 updates the last sync time. The process then returns to step 1632.

At steps 1632 and 1634, the poller wakes up periodically (e.g., 1 second or some other time period, which is user-configurable) and checks the elapsed time since the last sync time to see if the time interval between updates has elapsed, i.e., greater than "synchIntervalInSeconds" that has been defined in the input schema. Once the time interval between updates has elapsed, the poller at step 1636 sends updates to the inventory data specified in the input schema to the central orchestrator. Upon receipt of the updated inventory data from the poller, the central orchestrator at step 1626 determines that a full sync is not being performed. Therefore, the central orchestrator at step 1628 updates the inventory records in memory (e.g., by deleting old records, inserting new records, and updating existing records) according to the updates. Upon completion of step 1628, an ack message is sent back to the poller, which at step 1640 updates the last sync time. The process then returns to step 1632.

The poller is able to determine which of the inventory data specified in the input schema have been updated based on the notifications that it received from the cloud computing management software and the virtualization management software in response to the APIs that were issued as described above. However, the steps in the flow diagram of FIG. 16 described above do not include any steps of issuing APIs to the cloud computing management software and the virtualization management software, because the steps of issuing such APIs are not part of the sequence of steps that are carried out in response to an inventory request received from the central orchestrator. It should be understood that such APIs are issued when the input schema which designates one or more properties of inventory collections that HI MS 1510 are to collect and track for changes, is defined.

In one or more embodiments, the steps in the flow diagram of FIG. 16 may be implemented to report dynamic utilization data of virtual resources, such as a percentage of available CPU cores, a percentage of available memory, a percentage of available storage, and average ingress/egress network speed. In one example, dynamic utilization data of virtual resources provisioned by the virtualization management software is reported to the central orchestrator to indicate the overall load on the data center. In another example, dynamic utilization data of virtual resources provisioned by the cloud computing management software for a particular tenant is to the central orchestrator to indicate whether or not additional virtual resources need to be deployed in the data center by that tenant.

The requests for inventory also include an on-demand full sync request and on-demand partial sync request. For example, the central orchestrator sends an on-demand full sync request to a data center when in-memory and data store copies of inventory data reported by the data center have been corrupted. In such cases, the central orchestrator sends a request for inventory to the data center along with an input schema and the steps in the flow diagram of FIG. 16 are executed as described above.

The central orchestrator also may send an on-demand partial sync request to a data center to force synchronization of the inventory data from a data center before the synchronized data is pushed thereto by the data center. For example, instead of sending an intent to deploy the VNF to the best-matched data center at step 1026 described above, the central orchestrator sends an issues an on-demand partial sync request to the best-matched data center. In response to this request, the best-matched data center wakes up the poller to execute step 1636 described above (i.e., to send updates to the inventory data specified in the input schema to the central orchestrator).

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method of collecting and reporting inventory of resources deployed in a first data center to a central orchestrator that is tracking inventory of resources deployed across a plurality of data centers, wherein the first data center is one of the plurality of data centers and includes hardware resources, a virtualization management server that is running a virtualization management software to provision virtual resources from the hardware resources, and a cloud management server running a cloud computing management software to provision the virtual resources for a plurality of tenants of the first data center, said method comprising:

executing a first API call to the virtualization management software to collect first inventory of virtual resources deployed in the first data center according to a first input schema, wherein the virtualization management software collects the first inventory according to the first input schema in response to the first API call;

executing a second API call to the cloud computing management software to collect second inventory of the virtual resources deployed in the first data center according to a second input schema that is different from the first input schema, wherein the cloud computing management software collects the second inventory according to the second input schema in response to the second API call;

storing the first inventory collected according to the first input schema and the second inventory collected according to the second input schema; and in response to an inventory request from the central orchestrator, initially sending a subset of the stored first and second inventories to the central orchestrator in accordance with a third input schema that is included in the inventory request and is different from the first and second input schemas, and thereafter sending updates to the subset to the central orchestrator periodically.

2. The method of claim 1, wherein the first inventory specifies the virtual resources deployed in the first data center and available to be allocated to any tenant and the second inventory specifies the virtual resources deployed in the first data center and available to be allocated to only one of the tenants.

3. The method of claim 2, wherein the virtual resources include virtual machines that implement virtual network functions of a network service, and a virtual network that connects the virtual machines.

4. The method of claim 3, wherein said one of the tenants is an operator of the network service.

5. The method of claim 1, wherein the updates to the subset are sent to the central orchestrator at a periodic interval set forth in the inventory request.

6. The method of claim 1, wherein the first and second API calls cause the virtualization management software and the cloud computing management software, respectively, to send notifications of changes to the first inventory and the second inventory, respectively.

7. The method of claim 6, further comprising:
updating the stored first inventory and the stored second inventory based on the notifications.

8. The method of claim 1, wherein the first inventory includes dynamic utilization data that indicate a usage level of the virtual resources that are available to any tenant in the data center, and the second inventory includes dynamic utilization data that indicate a usage level of the virtual resources that are available to a particular tenant in the data center.

9. The method of claim 1, wherein
the data centers include a first number of core data centers, a second number of regional data centers, and a third number of edge data centers, the first number being less than the second number and the third number being greater than the second number by at least one order of magnitude.

10. The method of claim 9, wherein the first data center is one of the core data centers.

11. The method of claim 9, wherein the first data center is one of the regional data centers.

12. The method of claim 9, wherein the first data center is one of the edge data centers.

13. A non-transitory computer-readable medium comprising instruction executable in a computer system, wherein the instructions when executed in the computer system cause the computer system to carry out a method of collecting and reporting inventory of resources deployed in a first data center to a central orchestrator that is tracking inventory of resources deployed across a plurality of data centers, wherein the first data center is one of the plurality of data centers and includes hardware resources, a virtualization management server that is running a virtualization management software to provision virtual resources from the hardware resources, and a cloud management server running a cloud computing management software to provision the virtual resources for a plurality of tenants of the first data center, said method comprising:

executing a first API call to the virtualization management software to collect first inventory of virtual resources deployed in the first data center according to a first input schema, wherein the virtualization management software collects the first inventory according to the first input schema in response to the first API call;

executing a second API call to the cloud computing management software to collect second inventory of the virtual resources deployed in the first data center according to a second input schema that is different from the first input schema, wherein the cloud computing management software collects the second inventory according to the second input schema in response to the second API call;

storing the first inventory collected according to the first input schema and the second inventory collected according to the second input schema; and in response to an inventory request from the central orchestrator, initially sending a subset of the stored first and second inventories to the central orchestrator in accordance with a third input schema that is included in the inventory request and is different from the first and second input schemas, and thereafter sending updates to the subset to the central orchestrator periodically.

14. The non-transitory computer-readable medium of claim 13, wherein the first inventory specifies the virtual resources deployed in the first data center and available to be allocated to any tenant and the second inventory specifies the virtual resources deployed in the first data center and available to be allocated to only one of the tenants.

15. The non-transitory computer-readable medium of claim 14, wherein the virtual resources include virtual machines that implement virtual network functions of a network service, and a virtual network that connects the virtual machines.

16. The non-transitory computer-readable medium of claim 15, wherein said one of the tenants is an operator of the network service.

17. The non-transitory computer-readable medium of claim 13, wherein the updates to the subset are sent to the central orchestrator at a periodic interval set forth in the inventory request.

18. The non-transitory computer-readable medium of claim 13, wherein the first inventory includes dynamic utilization data that indicate a usage level of the virtual resources that are available to any tenant in the data center, and the second inventory includes dynamic utilization data that indicate a usage level of the virtual resources that are available to a particular tenant in the data center.

19. A computer system for collecting and reporting inventory of resources deployed in a first data center to a central orchestrator that is tracking inventory of resources deployed across a plurality of data centers, wherein the first data center is one of the plurality of data centers and includes hardware resources, a virtualization management server that is running a virtualization management software to provision virtual resources from the hardware resources, and a cloud management server running a cloud computing management software to provision the virtual resources for a plurality of tenants of the first data center, said computer system comprising:
a processor programmed to execute a first API call to the virtualization management software to collect first inventory of virtual resources deployed in the first data center according to a first input schema, and a second API call to the cloud computing management software to collect second inventory of virtual resources deployed in the first data center according to a second input schema that is different from the first input schema, wherein the virtualization management software collects the first inventory according to the first input schema in response to the first API call and the cloud computing management software collects the second inventory according to the second input schema in response to the second API call; and
a data store in which the first inventory collected according to the first input schema and the second inventory collected according to the second input schema, are stored, wherein the processor is further programmed to, in response to an inventory request from the central orchestrator, initially send a subset of the stored first and second inventories to the central orchestrator in accordance with a third input schema that is included in the inventory request and is different from the first and second input schemas, and thereafter send updates to the subset to the central orchestrator periodically, wherein the first inventory specifies the virtual resources deployed in the first data center and available to be allocated to any tenant and the second inventory specifies the virtual resources deployed in the first data center and available to be allocated to only one of the tenants.

20. The computer system of claim 19, wherein the first inventory includes dynamic utilization data that indicate a usage level of the virtual resources that are available to any tenant in the data center, and the second inventory includes dynamic utilization data that indicate a usage level of the virtual resources that are available to a particular tenant in the data center.

* * * * *